United States Patent
Wang et al.

(10) Patent No.: US 11,063,668 B2
(45) Date of Patent: Jul. 13, 2021

(54) MULTI-PATH MULTI-MODE LIGHT SIGNAL AGGREGATION, TRANSMISSION AND SEPARATION APPARATUS AND METHOD

(71) Applicant: HANGZHOU MO-LINK TECHNOLOGY CO. LTD, Hangzhou (CN)

(72) Inventors: Hao Wang, Hangzhou (CN); Dong Wang, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 0 days.

(21) Appl. No.: 16/644,353

(22) PCT Filed: Aug. 28, 2018

(86) PCT No.: PCT/CN2018/102704
§ 371 (c)(1),
(2) Date: Mar. 4, 2020

(87) PCT Pub. No.: WO2020/034255
PCT Pub. Date: Feb. 20, 2020

(65) Prior Publication Data
US 2020/0204260 A1 Jun. 25, 2020

(30) Foreign Application Priority Data
Aug. 17, 2018 (CN) .......... 201810943484.1

(51) Int. Cl.
*H04B 10/25* (2013.01)
*G02B 6/293* (2006.01)
(Continued)

(52) U.S. Cl.
CPC ..... *H04B 10/25891* (2020.05); *G02B 6/2938* (2013.01); *G02B 6/4246* (2013.01); *H04B 10/2581* (2013.01)

(58) Field of Classification Search
CPC .......... H04B 10/25891; H04B 10/2581; H04B 10/25; G02B 6/2938; G02B 6/4246; (Continued)

(56) References Cited

U.S. PATENT DOCUMENTS 6,563,976 B1 * 5/2003 Grann ................ G02B 6/29311
385/24
9,331,782 B2 * 5/2016 Sorin ................... H04B 10/801
(Continued)

*Primary Examiner* — Abbas H Alagheband
(74) *Attorney, Agent, or Firm* — Li & Cai Intellectual Property (USA) Office

(57) ABSTRACT

A multi-path multi-mode light signal aggregation, transmission, separation apparatus and method are provided. The apparatus includes a shell, an array lens module configured to turn multi-path multi-mode light signals having different frequencies and emitted by an emitting terminal and further totally reflect the light signals to a receiving terminal, an aggregation lens module configured to aggregate the turned light signals into a single-path multi-mode light signal and further disperse the single-path multi-mode light signal into the multi-path multi-mode light signals with different frequencies, and a collimation lens module configured to collimate the aggregated single-path multi-mode light signal to an optical fiber for transmission and to collimate the received single-path multi-mode light signal to the aggregation lens module. The lens modules are arranged on a substrate in the shell. The number of optical fibers and the upgrading cost can be reduced, and the communication rate is increased.

12 Claims, 4 Drawing Sheets

(51) Int. Cl.
*G02B 6/42* (2006.01)
*H04B 10/2581* (2013.01)

(58) Field of Classification Search
CPC ...... G02B 6/4206; G02B 6/4214; G02B 6/43; H04J 14/04
USPC .......................................................... 398/116
See application file for complete search history.

(56) References Cited

U.S. PATENT DOCUMENTS

| | | | |
|---|---|---|---|
| 9,417,390 B2* | 8/2016 | Sorin | G02B 6/42 |
| 10,511,386 B2* | 12/2019 | Sorin | G02B 6/2938 |
| RE48,029 E * | 6/2020 | Chang | G02B 6/2938 |
| 2013/0330080 A1* | 12/2013 | Li | G02B 6/29367 |
| | | | 398/79 |
| 2017/0242195 A1* | 8/2017 | Lin | G02B 6/29367 |

* cited by examiner

MULTI-PATH MULTI-MODE LIGHT SIGNAL AGGREGATION, TRANSMISSION AND SEPARATION APPARATUS AND METHOD

FIELD OF THE DISCLOSURE

The present disclosure belongs to the technical field of information transmission, and more particularly relates to a multi-path multi-mode light signal aggregation, transmission and separation apparatus and method.

BACKGROUND OF THE DISCLOSURE

With the increasing transmission capacity in the field of communications, the traditional transmission technology has been difficult to meet the requirements of transmission capacity and transmission speed. At present, data centers and families have increasingly high requirements for bandwidth, and the wiring cost and difficulty have become bottlenecks for future application upgrading. In the prior art, a multi-mode optical fiber can realize simultaneous transmission of multi-frequency light signals. In order to realize transmission of multiple light beams, the transmission is mostly carried out in the following method: collimating the light beams at first, then separating the light beams with different wavelengths by using a filter, and transmitting each light beam through different optical fibers after each light beam is focused. In this way, the light path is complex, more lenses are used, the volume is large, the cost is high, and a plurality of optical fibers is needed for transmission. In the future, how to easily realize the upgrading of equipment without changing optical cable so as to increase the bandwidth by times and reduce the upgrading cost becomes an urgent problem to be solved.

SUMMARY OF THE DISCLOSURE

In response to the above-referenced technical inadequacies, the present disclosure provides a multi-path multi-mode light signal aggregation, transmission and separation apparatus and method.

In one aspect, the present disclosure provides a multi-path multi-mode light signal aggregation, transmission and separation apparatus, including a shell, and an array lens module, an aggregation lens module and a collimation lens module which are arranged on a substrate in the shell. The array lens module, the aggregation lens module and the collimation lens module are all bidirectional.

In certain embodiments, the present disclosure provides a multi-path multi-mode light signal aggregation, transmission and separation apparatus. The array lens module is configured to collimate and totally reflect multi-path multi-mode light signals having different frequencies and emitted by an emitting terminal to realize turning of a light path. The aggregation lens module is configured to aggregate the turned multi-path multi-mode light signals into a single-path multi-mode light signal. The collimation lens module is configured to converge the aggregated single-path multi-mode light signal to an optical fiber for transmission.

In certain embodiments, the collimation lens module is also configured to collimate the received single-path multi-mode light signal to the aggregation lens module, the aggregation lens module is also configured to disperse the single-path multi-mode light signal into multi-path multi-mode light signals with different frequencies, and the array lens module is also configured to totally reflect the multi-path multi-mode light signals with different frequencies to a receiving terminal.

In certain embodiments, the array lens module uses one or more lenses.

In certain embodiments, each lens includes a first surface, a second surface, and a third surface.

In certain embodiments, the multi-path multi-mode light signals emitted by the emitting terminal enter the lenses through the first surfaces of the lenses, are reflected by the second surfaces, then are transmitted out of the lenses through the third surfaces, and enter the aggregation lens module.

In certain embodiments, the multi-path multi-mode light signals dispersed by the aggregation lens module enter the lenses through the third surfaces of the lenses, are reflected by the second surfaces, then are transmitted out of the lenses through the first surfaces, and enter the receiving terminal.

In certain embodiments, preferably, an included angle between the second surface of each lens and each light signal is 45 degrees.

In certain embodiments, the aggregation lens module uses one or more aggregation lenses.

In certain embodiments, further, each aggregation lens includes a substrate and diaphragms.

In certain embodiments, the substrate is of a parallelepiped structure, and a plurality of diaphragms is uniformly arranged on the top surface of the substrate in a spacing manner. The diaphragms are arranged on one side of the top surface of the substrate. First anti-reflection films are arranged on the top surfaces of the diaphragms, and Wavelength Division Multiplexing (WDM) films are arranged on the bottom surfaces of the diaphragms.

In certain embodiments, a second anti-reflection film and a high-reflection film are arranged on the bottom surface of the substrate, and cover the whole bottom surface of the substrate. The second anti-reflection film and the diaphragms on the top surface of the substrate are arranged on the same side of the top surface of the substrate.

In certain embodiments, preferably, an included angle between the left or right side surface of the substrate and the bottom surface is 75 to 80 degrees.

In certain embodiments, further, the multi-path multi-mode light signal aggregation, transmission and separation apparatus further includes a driving controller, at least one information sending wafer and at least one information receiving wafer.

In certain embodiments, under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer.

In certain embodiments, under the control of the driving controller, the information receiving wafer converts an external input light signal reaching a receiving surface of the information receiving wafer into an electrical signal, and outputs the electrical signal. The external input light signal is transmitted through an optical fiber corresponding to the information receiving wafer. The single-path multi-mode light signal received through the optical fiber is sequentially collimated through the collimation lens module, dispersed through the aggregation lens module and turned through the array lens module, and then enters the information receiving wafer.

In one aspect, the present disclosure further provides a multi-path multi-mode light signal aggregation, transmission and separation method, including the following steps:

collimating multi-mode light signals with different frequencies to a reflecting surface of an array lens module;

totally reflecting the multi-path multi-mode light signals on the reflecting surface of the array lens module to realize turning of a light path;

re-collimating the turned multi-path multi-mode light signals to an aggregation lens module;

aggregating, by the aggregation lens module, the multi-path multi-mode light signals into a single-path multi-mode light signal; and inputting the single-path multi-mode light signal into an optical fiber through a collimation lens module for transmission.

In certain embodiments, the multi-path multi-mode light signal aggregation, transmission and separation method further includes the following steps:

inputting the single-path multi-mode light signal into the aggregation lens module through the collimation lens module, and dispersing the single-path multi-mode light signal into multi-path multi-mode light signals with different frequencies through the aggregation lens module; and receiving the multi-path multi-mode light signals after the multi-path multi-mode light signals are turned through the array lens module.

Therefore, according to the specific implementation modes of the present disclosure, at least the following beneficial effects can be achieved: the multi-path multi-mode light signals with different frequencies are turned through the array lens module; the multi-path multi-mode light signals are aggregated into the single-path multi-mode light signal through the aggregation lens module; the single-path multi-mode light signal is rapidly and efficiently collimated through the collimation lens module and then sent into the optical fiber for long-distance transmission. The whole light path is reversible, the transmission of the multi-path multi-mode light signals can be realized only through one optical fiber, and the whole apparatus is small in volume and low in cost. In addition, in an actual use process, since only one optical fiber is needed to transmit the signals, the problem of an optical fiber connection error can be avoided. The present disclosure can further easily realize the upgrading of equipment without changing an original optical cable, so that the bandwidth is increased by times, and the upgrading cost is reduced.

It should be understood that both the foregoing general descriptions and the following specific implementation modes are exemplary and explanatory only and are not restrictive of the present disclosure, as claimed.

BRIEF DESCRIPTION OF THE DRAWINGS

The accompanying drawings below, which constitute a part of this description of the present disclosure, illustrate embodiments of the present disclosure and, together with the description, serve to explain the principles of the present disclosure.

DETAILED DESCRIPTION OF THE EXEMPLARY EMBODIMENTS

Figure 1:
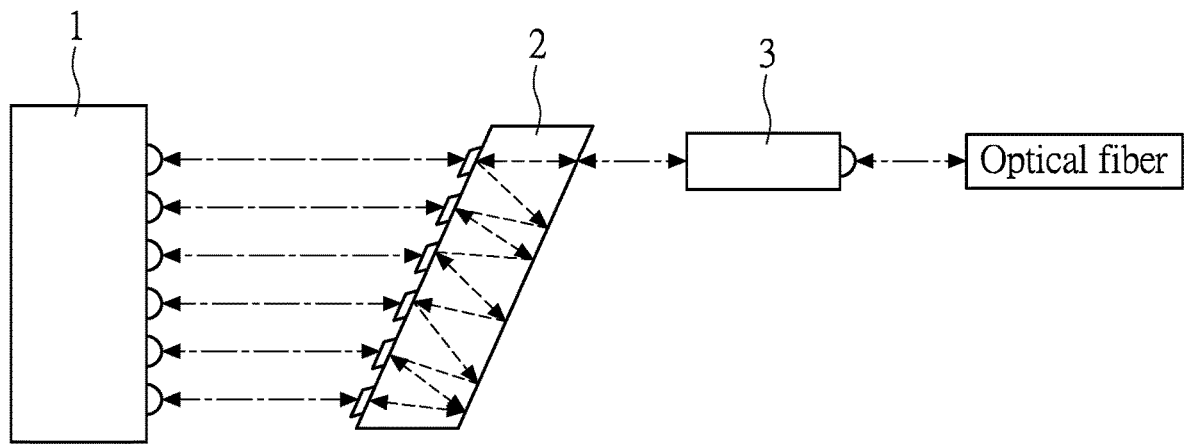
FIG. 1 is a schematic diagram of one embodiment of a multi-path multi-mode light signal aggregation, transmission and separation apparatus provided by a specific implementation mode of the present disclosure.

In order to make the objectives, technical solutions, and advantages of the embodiments of the present disclosure clearer, the spirit of content disclosed in the present disclosure will be apparently described from the accompanying drawings and details. Any person skilled in the art can make changes and modifications by virtue of the technologies taught in the content of the present disclosure after learning about the embodiments of the content of the present disclosure, without departing from the spirit and scope of the content of the present disclosure.

The illustrative embodiments of the present disclosure and descriptions thereof are intended to be illustrative of the present disclosure and not intended to limit the present disclosure. In addition, elements/components having the like or similar reference numbers used in the drawings and the implementation modes are used to indicate the like or similar parts.

As used herein, "first", "second" and the like do not specifically refer to an order or sequential meaning, nor are they intended to limit the present disclosure, which are solely for distinguishing elements or operations described in the same technical language.

As used herein, directional terms, such as: up, down, left, right, front or rear, etc., are directions only with reference to the drawings. Accordingly, the directional terms are for the purpose of description and not of limitation.

As used herein, "comprising", "including", "having", "containing", and the like are open terms that refer to, but not limited to, including.

As used herein, the term "and/or" includes any or all combinations of the described objects.

"Plurality" as used herein includes "two" and "two or more"; and "plurality of groups" as used herein includes "two groups" and "more than two groups".

As used herein, the terms "substantially", "about", and the like are used to modify any amount or error that may vary slightly, but these subtle variations or errors do not alter its nature. In general, subtle variations or errors modified by this type of terms may be 20 percent in some embodiments, 10 percent in some embodiments, and 5 percent or other values in some embodiments. It should be appreciated by those skilled in the art that the aforementioned values may be adjusted according to practical requirements and are not limited thereto.

Certain terms used to describe the present disclosure are discussed below or elsewhere in this description to provide additional guidance to those skilled in the art in connection with the description of the present disclosure.

FIG. 1 is a schematic diagram of one embodiment of a multi-path multi-mode light signal aggregation, transmission and separation apparatus of the present disclosure. As shown in FIG. 1, the multi-path multi-mode light signal aggregation, transmission and separation apparatus includes a shell, and an array lens module 1, an aggregation lens module 2 and a collimation lens module 3 which are arranged on a substrate in the shell. The array lens module 1 is configured to collimate and totally reflect multi-path multi-mode light signals having different frequencies and emitted by an emitting terminal, so as to realize turning of a light path. The aggregation lens module 2 is configured to aggregate the turned multi-path multi-mode light signals into a single-path multi-mode light signal. The collimation lens module 3 is configured to converge the aggregated single-path multi-mode light signal to an optical fiber for long-distance transmission. The array lens module 1, the aggregation lens module 2 and the collimation lens module 3 are all bidirectional. The collimation lens module 3 is also configured to collimate the received single-path multi-mode light signal to the aggregation lens module 2. The aggregation lens module 2 is also configured to disperse the single-path multi-mode light signal into the multi-path multi-mode light signals with different frequencies. The array lens module 1 is also configured to totally reflect the multi-path multi-mode light signals with different frequencies to a receiving terminal.

Based on the multi-path multi-mode light signal aggregation, transmission and separation apparatus provided by the above embodiment of the present disclosure, the multi-path multi-mode light signals with different frequencies are turned through the array lens module 1, and then are aggregated into the single-path multi-mode light signal through the aggregation lens module 2, and the single-path multi-mode light signal is quickly and efficiently collimated through the collimation lens module 3 and then sent into the optical fiber for the long-distance transmission. The whole light path is reversible, the transmission of the multi-path multi-mode light signals can be realized only through one optical fiber, and the whole apparatus is small in volume and low in cost. In addition, in an actual use process, since only one optical fiber is needed to transmit the signals, the problem of an optical fiber connection error can be avoided. The present disclosure can further easily realize the upgrading of equipment without changing an original optical cable, so that the bandwidth is increased by times, and the upgrading cost is reduced.

Figure 2:
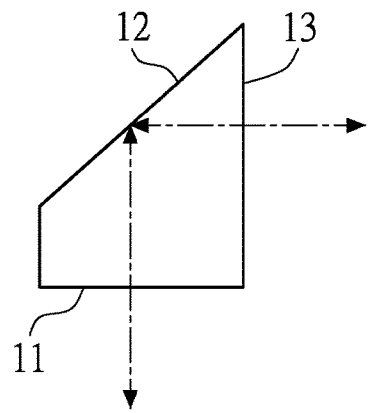
FIG. 2 is a schematic diagram of one embodiment of an array lens module in a multi-path multi-mode light signal aggregation, transmission and separation apparatus provided by a specific implementation mode of the present disclosure.

FIG. 2 is a schematic diagram of one embodiment of the array lens module 1 in the apparatus of the present disclosure. The array lens module 1 may use one or more lenses. As shown in FIG. 2, when one lens is used, the lens may include a first surface 11, a second surface 12, and a third surface 13. During sending of the multi-path multi-mode light signals, the multi-path multi-mode light signals emitted by the emitting terminal enter the lens through the first surface 11 of the lens, then are reflected by the second surface 12, and are transmitted out of the lens through the third surface 13, and enter the aggregation lens module 2. During receiving of the multi-path multi-mode light signals, the multi-path multi-mode light signals dispersed by the aggregation lens module 2 enter the lens through the third surface 13 of the lens, then are reflected by the second surface 12, and are transmitted out of the lens through the first surface 11, and enter the receiving terminal. Preferably, an included angle between the second surface 12 of the lens and each light signal is 45 degree.

Figure 3:
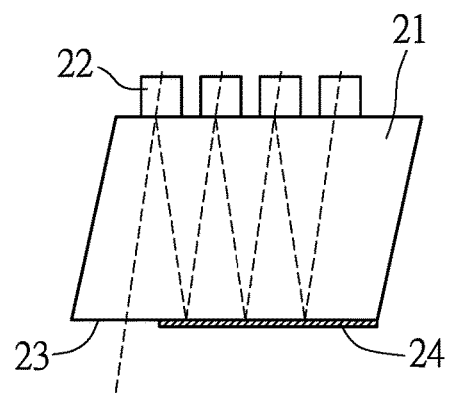
FIG. 3 is a schematic diagram of one embodiment of an aggregation lens module in a multi-path multi-mode light signal aggregation, transmission and separation apparatus provided by a specific implementation mode of the present disclosure.

FIG. 3 is a schematic diagram of one embodiment of the aggregation lens module 2 in the apparatus of the present disclosure. The aggregation lens module 2 may use one or more aggregation lenses. As shown in FIG. 3, each aggregation lens includes a substrate 21 and diaphragms 22. The substrate 21 is of a parallelepiped structure. A plurality of diaphragms 22 are uniformly arranged on the top surface of the substrate 21 in a spacing manner. The diaphragms 22 are arranged on one side of the top surface of the substrate 21. The top surfaces of the diaphragms 22 are provided with first anti-reflection films, and the bottom surfaces are provided with Wavelength Division Multiplexing (WDM) films. Specifically, eight diaphragms 22 may be provided, and are arranged in two rows, each row including four diaphragms 22. A second anti-reflection film 23 and a high-reflection film 24 are arranged on the bottom surface of the substrate 21, and cover the whole bottom surface of the substrate 21. The second anti-reflection film 23 and the diaphragms 22 on the top surface of the substrate 21 are arranged on the same side of the substrate 21. Preferably, an included angle between the left or right side surface of the substrate 21 and the bottom surface is 75 to 80 degrees.

During the sending of the multi-path multi-mode light signals, the multi-path multi-mode light signals turned through the array lens module 1 enter the aggregation lens module 2 through the first anti-reflection films on the top surfaces of the diaphragms 22, then are reflected for multiple times by the high-reflection film 24 on the bottom surface of the substrate 21 and the WDM films on the bottom surfaces of the diaphragms 22, and enter the collimation lens module 3 through the second anti-reflection film 23 on the bottom surface of the substrate 21.

During the receiving of the single-path multi-mode light signal, the single-path multi-mode light signal collimated through the collimation lens module 3 enters the aggregation lens module 2 through the second anti-reflection film 23 on the bottom surface of the substrate 21, then is reflected for multiple times through the high-reflection film 24 and the WDM films on the bottom surfaces of the diaphragms 22, and enters the array lens module 1 through the first anti-reflection films on the top surfaces of the diaphragms 22.

Figure 4:
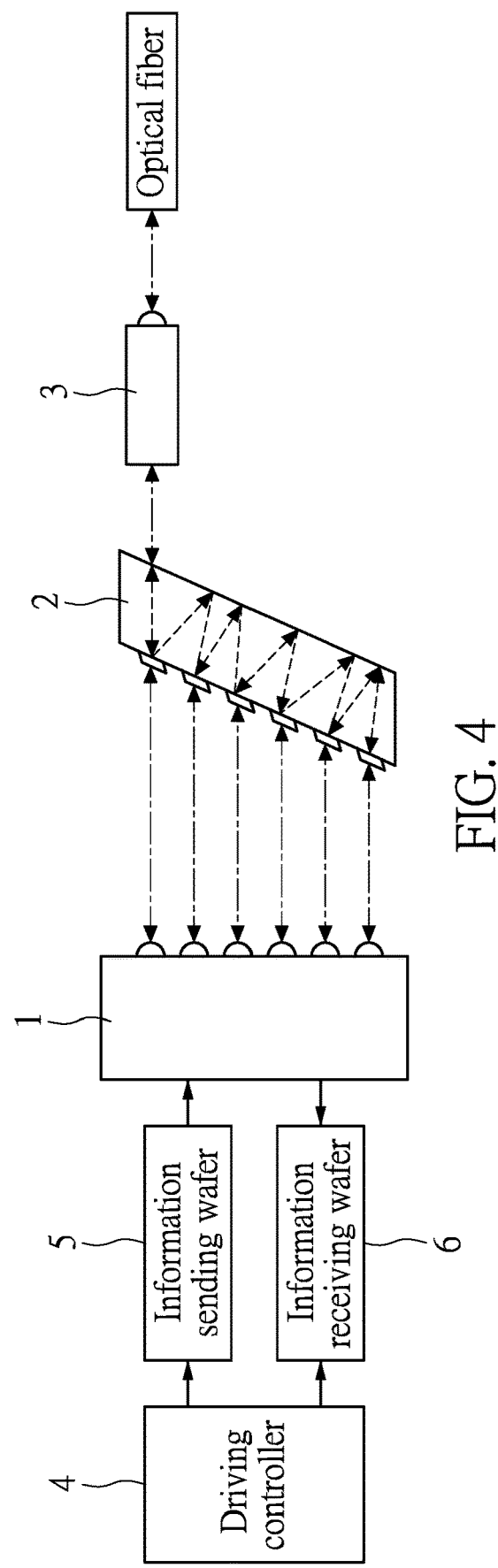
FIG. 4 is a schematic diagram of another embodiment of a multi-path multi-mode light signal aggregation, transmission and separation apparatus provided by a specific implementation mode of the present disclosure.

FIG. 4 is a schematic diagram of another embodiment of a multi-path multi-mode light signal aggregation, transmission and separation apparatus of the present disclosure. As shown in FIG. 4, the multi-path multi-mode light signal aggregation, transmission and separation apparatus further includes a driving controller 4, at least one information transmitting wafer 5 and at least one information receiving wafer 6.

Under the control of the driving controller 4, the information sending wafer 5 converts an electric signal to be transmitted into a light signal, and the light signal is sequentially turned through the array lens module 1, aggregated through the aggregation lens module 2 and collimated through the collimation lens module 3, and then is sent out by an optical fiber corresponding to the information sending wafer 5.

Under the control of the driving controller 4, the information receiving wafer 6 converts an external input light signal reaching a receiving surface of the information receiving wafer 6 into an electrical signal, and outputs the electrical signal. The external input light signal is transmitted through an optical fiber corresponding to the information receiving wafer 6. The single-path multi-mode light signal received through the optical fiber is sequentially collimated through the collimation lens module 3, dispersed through the aggregation lens module 2 and turned through the array lens module 1, and then enters the information receiving wafer 6.

Based on the multi-path multi-mode light signal aggregation, transmission and separation apparatus provided by the above embodiment of the present disclosure, by arranging the information sending wafers 5 and the information receiving wafers 6 in the same multi-path multi-mode light signal aggregation, transmission and separation apparatus, each information sending wafer 5 sends information through the corresponding optical fiber, and each information receiving wafer 6 receives information through the corresponding optical fiber, so that the sending and receiving of the light signals can be integrally realized.

Preferably, the information sending wafer 5 may use a Vertical Cavity Surface Emitting Laser (VCSEL), and the information receiving wafer 6 may use a Photo Detector (PD).

Figure 5:
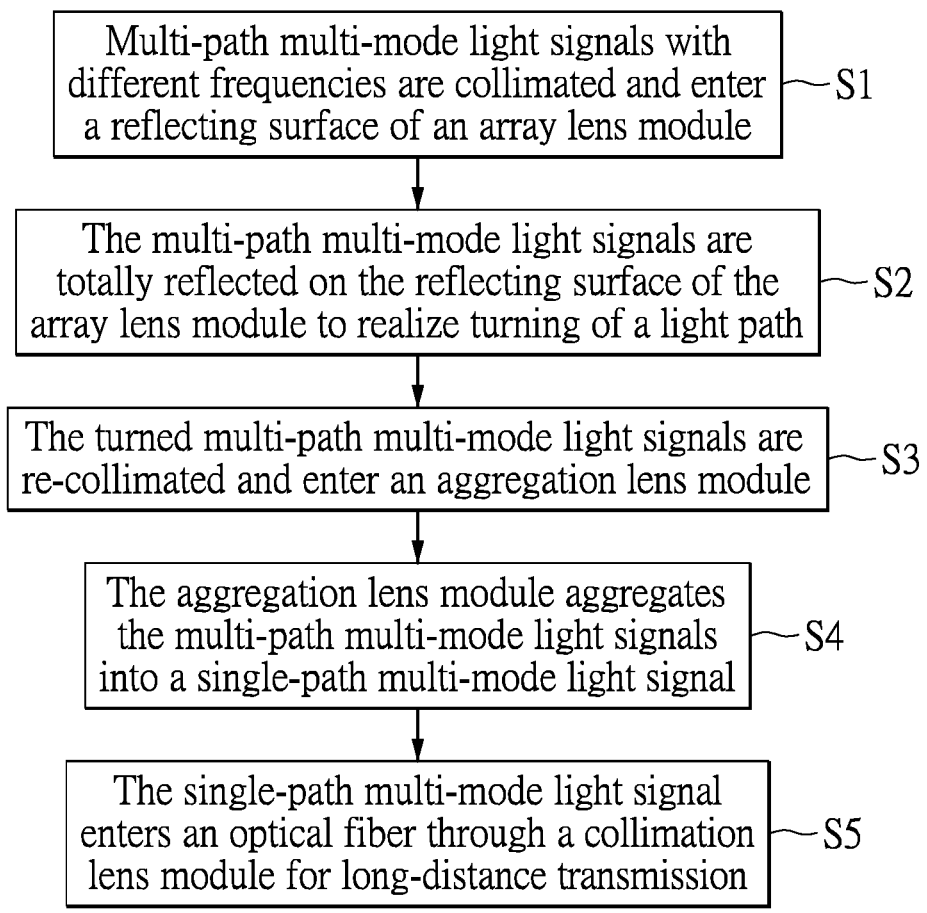
FIG. 5 is a flow diagram of a multi-path multi-mode light signal aggregation, transmission and separation method provided by a specific implementation mode of the present disclosure.

FIG. 5 is a flow diagram of a multi-path multi-mode light signal aggregation, transmission and separation method of the present disclosure. As shown in FIG. 5, when the multi-path multi-mode light signal aggregation, transmission and separation method is applied to a light emitting terminal, the method includes the following steps that:

S1, multi-path multi-mode light signals with different frequencies are collimated and enter a reflecting surface of an array lens module 1.

S2, the multi-path multi-mode light signals are totally reflected on the reflecting surface of the array lens module 1, so as to realize turning of a light path.

S3, the turned multi-path multi-mode light signals are re-collimated and enter an aggregation lens module 2.

S4, the aggregation lens module 2 aggregates the multi-path multi-mode light signals into a single-path multi-mode light signal.

S5, the single-path multi-mode light signal enters an optical fiber through a collimation lens module 3 for long-distance transmission.

Figure 6:
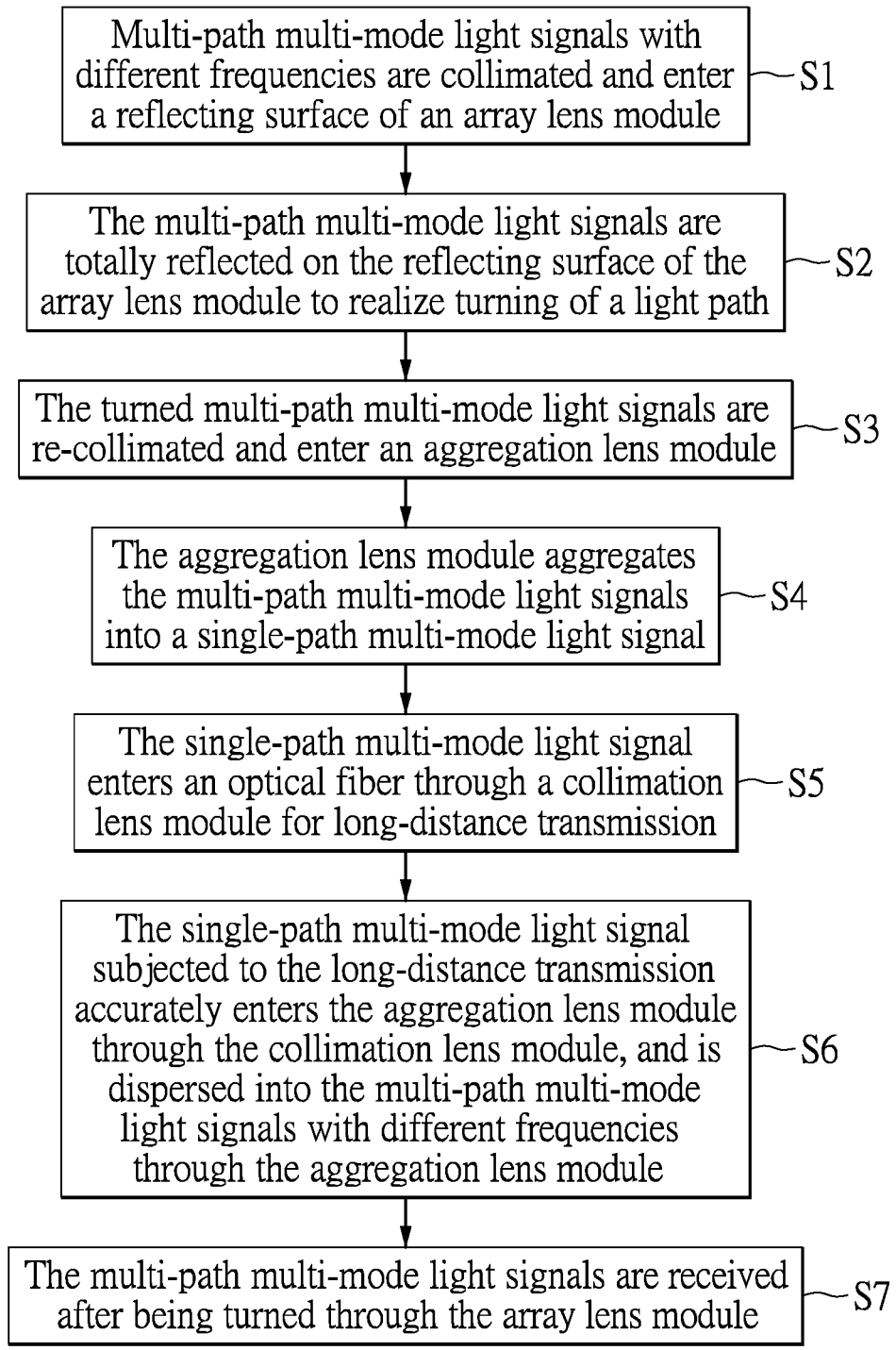
FIG. 6 is another flow diagram of a multi-path multi-mode light signal aggregation, transmission and separation method provided by a specific implementation mode of the present disclosure.

FIG. 6 is another flow diagram of a multi-path multi-mode light signal aggregation, transmission and separation method of the present disclosure. As shown in FIG. 6, when the multi-path multi-mode light signal aggregation, transmission and separation method is applied to a light receiving terminal, the method includes the following steps that:

S6, the single-path multi-mode light signal subjected to the long-distance transmission accurately enters the aggregation lens module 2 through the collimation lens module 3, and is dispersed into the multi-path multi-mode light signals with different frequencies through the aggregation lens module 2.

S7, the multi-path multi-mode light signals are received after being turned through the array lens module 1. Specifically, an angle at which the multi-path multi-mode light signals are turned through the array lens module 1 may be 90 degrees.

When a driving controller 4, at least one information sending wafer 5 and at least one information receiving wafer 6 are further arranged in the multi-path multi-mode light signal aggregation, transmission and separation apparatus, the multi-path multi-mode light signal aggregation, transmission and separation method further includes the following steps that:

Each information sending wafer 5 converts electrical signals to be transmitted into the multi-path multi-mode light signals with different frequencies and outputs the multi-path multi-mode light signals.

Each information receiving wafer 6 converts the received multi-path multi-mode light signals into electrical signals and outputs the electrical signals.

Based on the multi-path multi-mode light signal aggregation, transmission and separation method provided by the above embodiment of the present disclosure, during emission, the multi-path multi-mode light signals are converted into the single-path multi-mode light signal for the long-distance transmission, and during receiving, the single-path multi-mode light signal is then reduced into the multi-path multi-mode light signals, so that information transmission can be carried out efficiently and quickly at low cost. Upgrading of equipment can be easily realized without changing an original optical cable, so that the bandwidth is increased by times, and the updating cost is reduced. The present disclosure can also reduce the number of optical fibers and increase the communication rate.

The above descriptions are only schematic specific implementation modes of the present disclosure. Any equivalent changes and modifications that are made without departing from the concept and principle of the present disclosure by those skilled in the art should all fall within the protection scope of the present disclosure.

What is claimed is:

1. A multi-path multi-mode light signal aggregation, transmission and separation apparatus, comprising a shell, and an array lens module, an aggregation lens module and a collimation lens module which are arranged on a substrate in the shell, wherein the array lens module, the aggregation lens module and the collimation lens module are all bidirectional;

the array lens module is configured to collimate and totally reflect multi-path multi-mode light signals having different frequencies and emitted by an emitting terminal to realize turning of a light path; the aggregation lens module is configured to aggregate the turned multi-path multi-mode light signals into a single-path multi-mode light signal; the collimation lens module is configured to converge the aggregated single-path multi-mode light signal to an optical fiber for transmission;

the collimation lens module is further configured to collimate the received single-path multi-mode light signal to the aggregation lens module; the aggregation lens module is further configured to disperse the single-path multi-mode light signal into multi-path multi-mode light signals with different frequencies; and the array lens module is further configured to totally reflect the multi-path multi-mode light signals with different frequencies to a receiving terminal, wherein the array lens module uses one or more lenses, wherein each lens comprises a first surface, a second surface, and a third surface, wherein the multi-path multi-mode light signals emitted by the emitting terminal enter the lenses through the first surfaces of the lenses, are reflected by the second surfaces, then are transmitted out of the lenses through the third surfaces, and enter the aggregation lens module, and wherein the multi-path multi-mode light signals dispersed by the aggregation lens module enter the lenses through the third surfaces of the lenses, are reflected by the second surfaces, then are transmitted out of the lenses through the first surfaces, and enter the receiving terminal.

2. The multi-path multi-mode light signal aggregation, transmission and separation apparatus according to claim 1, wherein an included angle between the second surface of each lens and each light signal is 45 degrees.

3. The multi-path multi-mode light signal aggregation, transmission and separation apparatus according to claim 1, wherein the aggregation lens module uses one or more aggregation lenses.

4. The multi-path multi-mode light signal aggregation, transmission and separation apparatus according to claim 3, wherein each aggregation lens comprises a substrate and diaphragms;
   the substrate is of a parallelepiped structure, and a plurality of diaphragms are uniformly arranged on the top surface of the substrate in a spacing manner; the diaphragms are arranged on one side of the top surface of the substrate; first anti-reflection films are arranged on the top surfaces of the diaphragms, and Wavelength Division Multiplexing (WDM) films are arranged on the bottom surfaces of the diaphragms;
   a second anti-reflection film and a high-reflection film are arranged on the bottom surface of the substrate, and cover the whole bottom surface of the substrate; and the second anti-reflection film and the diaphragms on the top surface of the substrate are arranged on the same side of the top surface of the substrate.

5. The multi-path multi-mode light signal aggregation, transmission and separation apparatus according to claim 4, wherein an included angle between the left or right side surface of the substrate and the bottom surface is 75 to 80 degrees.

6. The multi-path multi-mode light signal aggregation, transmission and separation apparatus according to claim 1, further comprising a driving controller, at least one information sending wafer and at least one information receiving wafer;
   under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;
   under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

7. The multi-path multi-mode light signal aggregation, transmission and separation apparatus according to claim 1, further comprising a driving controller, at least one information sending wafer and at least one information receiving wafer;
   under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;
   under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

8. The multi-path multi-mode light signal aggregation, transmission and separation apparatus according to claim 1, further comprising a driving controller, at least one information sending wafer and at least one information receiving wafer;
   under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;
   under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

9. The multi-path multi-mode light signal aggregation, transmission and separation apparatus according to claim 2, further comprising a driving controller, at least one information sending wafer and at least one information receiving wafer;
   under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;
   under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

10. The multi-path multi-mode light signal aggregation, transmission and separation apparatus according to claim 3, further comprising a driving controller, at least one information sending wafer and at least one information receiving wafer;

under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;

under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

11. The multi-path multi-mode light signal aggregation, transmission and separation apparatus according to claim 4, further comprising a driving controller, at least one information sending wafer and at least one information receiving wafer;

under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;

under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

12. The multi-path multi-mode light signal aggregation, transmission and separation apparatus according to claim 5, further comprising a driving controller, at least one information sending wafer and at least one information receiving wafer;

under the control of the driving controller, the information sending wafer converts an electric signal to be transmitted into a light signal, and the light signal is sequentially turned through the array lens module, aggregated through the aggregation lens module and collimated through the collimation lens module, and then is sent out by an optical fiber corresponding to the information sending wafer;

under the control of the driving controller, the information receiving wafer converts an external input light signal reaching a receiving surface of the information receiving wafer into an electrical signal, and outputs the electrical signal; the external input light signal is transmitted through an optical fiber corresponding to the information receiving wafer; the single-path multi-mode light signal received through the optical fiber is sequentially collimated through the collimation lens module, dispersed through the aggregation lens module and turned through the array lens module, and then enters the information receiving wafer.

\* \* \* \* \*